Patented Sept. 2, 1941

2,255,025

UNITED STATES PATENT OFFICE 2,255,025

PROCESS OF TREATING FRUIT

Ralph H. Higby, Ontario, Calif., assignor to California Fruit Growers Exchange, Los Angeles, Calif., a corporation of California No Drawing. Application January 15, 1934, Serial No. 706,697

18 Claims. (Cl. 99—103)

This invention relates to a process for treating citrus fruit for the purpose of enhancing the appearance thereof. It is an object of the invention to provide and disclose an improved method and means for treating citrus fruit so as to improve the appearance thereof from a color standpoint.

It is another and further object of the invention to provide and disclose improved methods and means of treating citrus fruit so as to improve the color appearance thereof, and at the same time avoid the dangers and difficulties of processes heretofore known.

It is a further object of the invention to provide and disclose improved methods and means for imparting a pleasing and natural appearance to pale and off-color citrus fruit, while at the same time avoiding the deleterious and undesirable effects of processes heretofore known.

It is a still further object of the invention to provide and disclose improved means for the convenient and easy preparation of treating liquids for imparting a pleasing and natural appearance to pale and off-color citrus fruit.

Coloring of citrus fruits with dyes is not a completely new art. It is suggested, for example, in The Analyst, vol. 50, page 183, (1925). Brogden, in United States Patent 1,671,923, page 3, line 114 to page 4, line 2, suggests the use of butter color, or other suitable color, dissolved in kerosene, a kerosene fraction, or the like, for coloring pale fruit. Suitable butter colors, for use in such a process, are Yellow OB and Yellow AB. Where it is not desired to treat citrus fruit with a pure or substantially pure hydrocarbon solvent, or the like, it is, of course, well known practice in this art to emulsify the hydrocarbon material with water and a suitable emulsifier.

A serious disadvantage of a process of the type suggested by Brogden, whether or not emulsification of the oily material be resorted to, is that extensive pitting of the fruit will occur after treatment by such a process. This pitting may be characterized as a surface deterioration of the fruit apparently due to disturbance of the oil cells. It occurs as small, shallow, sunken areas, frequently discolored and usually becoming a brownish hue. The nature of a deterioration of this sort will be more fully understood by reference to Citrus Diseases and their Control, by Fawcett and Lee, McGraw-Hill Book Company, 1926, page 474.

I have discovered that it is possible to secure satisfactory action of the coloring material upon the surface of the fruit, so as to produce uniform coloration, without the use of a hydrocarbon solvent, such as kerosene, or other oily material. I accomplish this by forming a suspension of the dye to be employed in very finely divided form in the aqueous medium with which the fruit is to be treated. Any suitable dye, such as those referred to hereinbefore, may be employed. I prefer to employ Yellow OB. The dyes preferably employed are oil and wax soluble, but are not soluble in water to any appreciable extent, and thus a very finely divided suspension of solid dry particles may be formed in water without solution taking place to any appreciable degree.

My preferred method of carrying into effect the objects of this invention is to dissolve the dye to be employed in a suitable solvent which is then treated to form a soap in which the dye exists in the form of extremely finely divided particles.

An excellent dispersion may be made by dissolving the required amount of dye in oleic acid or any similar fatty acid, such as stearic or palmitic. Sodium hydroxide or potassium hydroxide in suitable form is then added to neutralize the acid. The dye is present in a very finely divided state as an integral part of the alkali-fatty acid soap formed by the reaction. Solution of this soap forms an extremely finely divided suspension of solid dye particles in the aqueous medium in which the soap is dissolved.

It is possible to form a suspension of the dye in an aqueous medium by dissolving it in a suitable solvent miscible with water, such as alcohol, and then adding this solution to water. However, I have found that, in suspensions prepared in accordance with my improved process, the average diameter of the solid dye particles in suspension is approximately only one-fifth that of the average diameter of the dye particles formed in suspension by adding an alcoholic solution to an aqueous medium. Moreover, a suspension prepared by my improved process exhibits a very greatly improved stability against settling and coagulation or coalescence.

The soap may be prepared so as to contain a predetermined amount of the dye so that a given weight of the soap is to be employed in conjunction with a given volume of water for preparing the treating liquid. This makes it possible to prepare the soap at some central point and distribute it as needed, obviating the necessity of handling small quantities of dye in the packing house, and also avoiding the possibility of making relatively large percentage errors in measurement of small quantities of dye at the packing house, the packing houses not being, ordinarily, equipped with any thing other than scales and volume measures of a sort designed to handle relatively large amounts.

A suitable soap may be made up from the following ingredients:

| | Parts |
|---|---|
| Oleic acid | 100 |
| Sodium hydroxide | 15 |
| Yellow OB | 15 |
| Water | 20 |

The proportions given are expressed as parts by weight. The dye is dissolved in the oleic acid and the sodium hydroxide and water added as an aqueous solution of sodium hydroxide. This mixture will yield approximately 108 parts of soap, expressed as anhydrous soap.

As an example of use, the above amount of soap may suitably be employed by dissolving it in approximately 12,000 parts of water, which will give to the solution a soap strength of approximately 0.9% and a dye strength of approximately 0.12%.

If desired, the dye may be dissolved in any suitable oil, such as cotton-seed oil, or any common glyceride of a fatty acid, or mixtures of such substances, and then saponified by treatment with a suitable alkali, such as potassium or sodium hydroxide. In general, I find this procedure less advisable than my preferred procedure which is to employ the fatty acid itself in making the soap.

A satisfactory dye concentration is from 0.02% to 0.5% of the final mixture. A satisfactory treating time is from 2 to 10 minutes. A satisfactory temperature is from 110 to 120° F. Obviously it will be possible to operate with marginal satisfaction outside these preferred limits.

I have further found that the addition of from 5 to 15% of a water miscible material, such as ethyl alcohol or isopropyl alcohol, will, in the treatment of oranges, induce the formation of a beautiful deep orange color in a relatively short time of treatment. A relative nonvolatile material, such as glycerine, is also reasonably satisfactory in the same relationship in approximately the same proportions. Since the type of equipment at present installed in and available in the vast majority of citrus packing houses which would be useful in carrying out a process of this sort comprises open top tanks, and since the treatment is ordinarily carried out in a temperature of 110° to 120° F., there will obviously be a considerable loss of any readily volatile material. For this reason, I do not at present prefer to employ an ordinary alcohol in substantial amounts even though it will, in the proportions indicated above, give a distinctly improved coloration.

I have further found that the securing of good results with this process may be greatly facilitated by treating the fruit, before it enters the dyeing bath, with a relatively small amount of any relatively neutral vegetable oil. Terpenes, and especially citrus terpenes, give eminently satisfactory results in this connection. This treatment may be carried out by spraying the fruit as it enters a set of polishing rolls with a small amount of the oil to be employed, and then permit the fruit, as it travels over the balance of the rolls, to be brushed with the polishing roll so as to distribute the oil in a uniform manner, and to wipe it dry, so as to leave only an extremely fine film over the fruit. Care should be taken than only so much oil is left on as will be readily absorbed by the skin of the fruit, and that there will be no excess of oil that could become freed from the surface of the fruit in the treating bath. Any suitable wiping or rubbing device may be employed in place of conventional polishing rolls of the type at present commonly employed.

The presence of the fine film of citrus terpenes, or the like, greatly improves the efficacy of the general treatment with a dye suspension, without regard to whether the suspension be formed by my preferred method.

The solution will preferably be agitated as by means of a recirculating pump. The fruit will preferably be immersed in the treating solution by means of any submerging device, a number of which are well known in the art.

It will be obvious that the primary practicable commercial application of this invention will be in imparting to oranges of good internal quality but relatively poor color appearance, a color appearance simulating that of the finest appearing fruit of the same variety.

Having thus fully described my invention in such full, clear, concise, and exact terms as to enable others skilled in the art to make, use, and compound the same, I claim as my invention and desire to secure by Letters Patent the following:

1. The process of preparing an orange-coloring material which comprises dissolving an oil-soluble, water-insoluble dye in a solvent capable of being saponified and then treating the solvent so as to form a soap containing the dye in finely divided solid particles.

2. The process of preparing an orange-coloring material which comprises the steps of dissolving a suitable oil-soluble, water-insoluble dye in a fatty acid and saponifying the acid to form a soap containing the dye in the form of extremely finely divided solid particles.

3. The process of preparing an orange-coloring material which comprises dissolving an orange colored oil-soluble, water-insoluble dye in oleic acid and neutralizing the oleic acid with an alkali to form a soap containing the dye in the form of extremely finely divided solid particles.

4. A citrus fruit coloring material comprising a solid soap containing extremely finely divided solid, undissolved particles of a suitable oil-soluble, water-insoluble dye dispersed therein.

5. The process of imparting a pleasing coloration to citrus fruit which comprises forming on the surface of the fruit a film of a relatively neutral vegetable oil in an amount capable of being readily absorbed by the skin of the fruit, and thereafter subjecting the fruit to the action of an aqueous suspension of finely divided solid particles of a suitable oil-soluble, water-insoluble dye.

6. The process of imparting a pleasing coloration to citrus fruit which comprises forming a soap containing extremely finely divided solid particles of a suitable oil-soluble, water-insoluble dye, dissolving the soap in an aqueous medium to form a stable suspension of the dye therein, and subjecting the fruit to the action of the dye suspension.

7. The process of imparting a pleasing coloration to citrus fruit which comprises forming a soap containing extremely finely divided particles of a suitable oil-soluble, water-insoluble dye, dissolving the soap in an aqueous medium to form a stable suspension of the dye therein, forming, on the surface of the fruit, a film of a relatively neutral vegetable oil in an amount readily absorbable by the skin of the fruit, and then subjecting the fruit to the action of the dye suspension.

8. The process of imparting a pleasing coloration to citrus fruit which comprises forming on the surface of the fruit a film of citrus terpenes in an amount capable of being readily absorbed by the skin of the fruit, and thereafter subjecting the fruit to the action of an aqueous suspension of a suitable oil-soluble, water-insoluble dye.

9. The process of imparting a pleasing coloration to citrus fruit which comprises forming a soap containing extremely finely divided solid particles of Yellow OB, dissolving the soap in an aqueous medium to form a stable suspension of the dye therein, forming, on the surface of the fruit, a film of a relatively neutral vegetable oil in an amount readily absorbable by the skin of the fruit, and then subjecting the fruit to the action of the suspension of Yellow OB.

10. The process of imparting a pleasing coloration to citrus fruit which comprises forming a soap containing extremely finely divided particles of a suitable oil-soluble, water-insoluble dye, dissolving the soap in an aqueous medium to form a stable suspension of the dye therein, forming, on the surface of the fruit, a film of citrus terpenes in an amount readily absorbable by the skin of the fruit, and then subjecting the fruit to the action of the dye suspension.

11. The process of imparting a pleasing coloration to citrus fruit which comprises dissolving in an aqueous medium a soap containing extremely finely divided solid particles of a suitable oil-soluble, water-insoluble dye so as to form a stable suspension of the dye therein, forming, on the surface of the fruit, a film of a relatively neutral vegetable oil in an amount readily absorbable by the skin of the fruit, and then subjecting the fruit to the action of the dye suspension.

12. The process of imparting a pleasing coloration to citrus fruit which comprises dissolving in an aqueous medium a soap containing extremely finely divided solid particles of a suitable oil-soluble, water-insoluble dye so as to form a stable suspension of the dye therein, forming, on the surface of the fruit, a film of citrus terpenes in an amount readily absorbable by the skin of the fruit, and then subjecting the fruit to the action of the dye suspension.

13. The process of imparting a pleasing coloration to citrus fruit which comprises forming on the surface of the fruit a film of citrus terpenes in an amount capable of being readily absorbed by the skin of the fruit, and thereafter subjecting the fruit to the action of an aqueous suspension of Yellow OB.

14. The process of imparting a pleasing coloration to citrus fruit which comprises forming on the surface of the fruit a film of citrus terpenes in an amount capable of being readily absorbed by the skin of the fruit, and thereafter subjecting the fruit to the action of a stable aqueous suspension of a suitable oil-soluble, water-insoluble dye.

15. The process of enhancing the varietal color of whole citrus fruit which comprises forming a soap having dispersed therein an oil-soluble, water-insoluble dye in the form of finely divided solid particles, dissolving the soap in water to form a relatively stable suspension of the dye therein, and then contacting the citrus fruit with the dye suspension for a time sufficient to enhance the varietal color thereof.

16. The process of enhancing the varietal color of whole citrus fruit which comprises reacting a higher fatty acid and an alkali in the presence of an oil-soluble, water-insoluble dye to form a soap in which the dye is dispersed in the form of finely divided solid particles, dissolving the soap in water to form a relatively stable suspension of the dye therein, and then contacting the citrus fruit with the dye suspension for a time sufficient to enhance the varietal color thereof.

17. The process of improving the color appearance of citrus fruit, which comprises dissolving in an aqueous medium a soap containing finely divided, solid, oil-soluble, water-insoluble dye particles and subjecting the fruit to the action of the dye suspension.

18. The process of imparting a pleasing coloration to citrus fruit, which comprises forming on the surface of the fruit a film of relatively neutral vegetable oil in an amount capable of being readily absorbed by the skin of the fruit, and thereafter subjecting the fruit to the action of an aqueous suspension of a suitable oil-soluble, water-insoluble dye.

RALPH H. HIGBY.